United States Patent
Wei

(10) Patent No.: US 8,086,051 B2
(45) Date of Patent: Dec. 27, 2011

(54) METHOD OF DECODING FETCHED SCENE ON ENCODED DOTMAP AND ELECTRONIC DEVICE THEREOF

(75) Inventor: Shou-Te Wei, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 601 days.

(21) Appl. No.: 12/335,537

(22) Filed: Dec. 16, 2008

(65) Prior Publication Data

US 2009/0102863 A1  Apr. 23, 2009

Related U.S. Application Data

(63) Continuation-in-part of application No. 11/672,142, filed on Feb. 7, 2007.

(30) Foreign Application Priority Data

Mar. 6, 2006 (TW) ................................ 95107426 A

(51) Int. Cl.
  *G06K 9/36* (2006.01)
(52) U.S. Cl. ................ 382/232; 356/138; 702/150
(58) Field of Classification Search .......... 382/100, 382/232, 233, 234, 236–239, 245–249, 276–301; 356/138, 139; 702/150, 151, 152, 153, 155
  See application file for complete search history.

(56) References Cited

U.S. PATENT DOCUMENTS

| | | | |
|---|---|---|---|
| 5,825,947 A | 10/1998 | Sasaki | |
| 5,866,895 A | 2/1999 | Fukuda | |
| 5,886,335 A | 3/1999 | Matsueda | |
| 5,897,669 A | 4/1999 | Matsui | |
| 6,052,813 A * | 4/2000 | Nagasaki et al. | 714/752 |
| 6,173,890 B1 | 1/2001 | Shimizu | |
| 6,279,830 B1 | 8/2001 | Ishibashi | |
| 6,364,209 B1 | 4/2002 | Tatsuta | |
| 6,548,768 B1 * | 4/2003 | Pettersson et al. | 178/18.01 |
| 6,560,293 B1 | 5/2003 | Alelyunas | |
| 6,624,823 B2 * | 9/2003 | Deering | 345/613 |
| 6,950,519 B2 * | 9/2005 | Rhoads | 382/100 |
| 7,090,129 B2 | 8/2006 | Tatsuta | |
| 7,209,128 B2 * | 4/2007 | Shaked et al. | 345/176 |
| 7,280,699 B2 * | 10/2007 | Kojima | 382/238 |
| 7,453,447 B2 | 11/2008 | Marggraff | |
| 7,502,489 B2 * | 3/2009 | Rhoads | 382/100 |
| 7,542,607 B2 | 6/2009 | Bartolome | |
| 7,546,950 B2 | 6/2009 | Thiyagarajah | |
| 7,952,750 B2 * | 5/2011 | Arakawa | 358/1.8 |
| 2002/0047870 A1 | 4/2002 | Carro | |
| 2002/0181792 A1 | 12/2002 | Kojima | |
| 2003/0072489 A1 | 4/2003 | Reichenbach | |
| 2006/0241893 A1 | 10/2006 | Van Thong | |
| 2007/0019808 A1 | 1/2007 | Gonzalez | |

(Continued)

FOREIGN PATENT DOCUMENTS

CA  2 554 162 A1  8/2005

(Continued)

*Primary Examiner* — Anand Bhatnagar

(74) *Attorney, Agent, or Firm* — Winston Hsu; Scott Margo

(57) ABSTRACT

By determining a center physical grid dot at intersects of virtual grid lines of a fetched scene on an encoded dotmap, and by defining a blank dot closest to the determined center physical grid dot on the fetched scene, the orientation of encoded blocks on the encoded dotmap may be determined. And therefore, a plurality of data dots on the fetched scene may also be decoded easily.

18 Claims, 9 Drawing Sheets

U.S. PATENT DOCUMENTS

| | | |
|---|---|---|
| 2007/0022370 A1 | 1/2007 | Lagardere |
| 2007/0164110 A1 | 7/2007 | Yoshida |
| 2008/0013113 A1 | 1/2008 | Gonzalez |
| 2008/0152224 A1 | 6/2008 | MacKenzie |
| 2008/0181447 A1 | 7/2008 | Adams |
| 2009/0161957 A1 | 6/2009 | Chan |
| 2010/0121737 A1 | 5/2010 | Yoshida |

FOREIGN PATENT DOCUMENTS

| | | |
|---|---|---|
| GB | 2 396 042 A | 6/2004 |
| TW | 528967 | 4/2003 |
| TW | 581970 | 4/2004 |

* cited by examiner

METHOD OF DECODING FETCHED SCENE ON ENCODED DOTMAP AND ELECTRONIC DEVICE THEREOF

CROSS REFERENCE TO RELATED APPLICATIONS

This application is a continuation-in-part of U.S. application Ser. No. 11/672,142, filed on Feb. 7, 2007, the contents of which are incorporated herein by reference.

BACKGROUND OF THE INVENTION

1. Field of the Invention

The present invention relates to a method of decoding fetched scene and an electronic device thereof, and more particularly, and more particularly, to a method of decoding a fetched scene on an encoded dotmap and an electronic device thereof.

2. Description of the Prior Art

Please refer to FIG. 1, which is a diagram of illustrating how grid dots of an encoded dotmap are used for indicating orientation of a scene 1, which covers a plurality of encoded blocks on the encoded dotmap. As shown in FIG. 1, there are four encoded blocks sectored by a first grid virtual line X and a second virtual grid line Y, where the first virtual grid line X is parallel to a first coordinate axis on the encoded dotmap, and the second virtual grid line Y is parallel to a second coordinate axis on the encoded dotmap. Note that the first virtual grid line X and the second virtual grid line Y are orthogonal to each other since the first coordinate axis and the second coordinate axis on the encoded dotmap are orthogonal to each other. A center physical grid dot 11 is located at an intersection of the first virtual grid line X and the second virtual grid line Y. A direction indicating grid dot 12 is located immediately adjacent to the center physical grid dot 11, and cooperates with the center physical grid dot 11 for indicating an orientation of the encoded dotmap. A first plurality of grid dots 13 spaced with an equal distance are aligned along the first virtual grid line X. The center physical grid dot 11, the direction indicating grid dot 12, and the first plurality of grid dots 13 are collinear along and overlapped by the first virtual grid line X. A second plurality of grid dots 14 spaced with the same equal distance are aligned along the second virtual grid line Y. The center physical grid dot 11 and the second plurality of grid dots 14 are collinear along and overlapped by the second virtual grid line Y. A plurality of data dots 15 are used for indicating information related to the encoded block having the plurality of data dots 15. Note that each of the plurality of data dots 15 cannot be collinear with any grid dots overlapped by either one of the first virtual grid line X or the second virtual grid line Y, i.e., each of the plurality of data dots 15 is not overlapped with either one of the first virtual grid line X or the second virtual grid line Y, so that each data dot 15 can be differentiated from the grid dots, which act as boundaries of the sectored encoded blocks, on the first virtual grid line X or the second virtual grid line Y.

As can be observed from FIG. 1, each time when the scene 1 is fetched on the encoded dotmap, orientation of the fetched scene 1 has to be recognized first so as to recognize encoded blocks covered by the fetched scene 1. The orientation of the fetched scene 1 is recognized according to orientation of the encoded blocks covered by the fetched scene 1, where orientation of each the encoded block is recognized according to a direction indicated from the center physical grid dot 11 to the direction indicating grid dot 12, i.e., the orientation of each the encoded block may be indicated by a combination of the center physical grid dot 11 and the direction indicating grid dot 12. Note that both the center physical grid dot 11 and the direction indicating grid dot 12 may have different characteristics in shape, color, size, or vein with other grid dots in the same encoded block so that the orientation of the encoded block may be determined quickly, though both the center physical grid dot 11 and the direction indicating grid dot 12 may also be staring and become easily recognized by naked eyes as a price because of the different characteristics. Note that in each encoded block covered by the scene 1, both the center physical grid dot 11 and the direction indicating grid dot 12 occupy same immediately adjacent locations.

SUMMARY OF THE INVENTION

The claimed invention discloses a method of decoding a fetched scene on an encoded dotmap. The method comprises determining a center physical grid dot located in an intersection of a first virtual grid line and a second virtual grid line, recognizing each physical grid dot aligned in the first virtual grid line and the second virtual grid line, defining a blank dot on the first virtual grid line, stretching a plurality of virtual lines parallel to the first virtual grid line on each physical grid dot on the second virtual grid line, stretching the plurality of virtual lines parallel to the second virtual grid line on each physical grid dot and the blank dot on the first virtual grid line, determining intersects of the generated plurality of virtual lines on the fetched scene, and decoding each data dot on the fetched scene based on positional relation thereof with a closest one of the intersects of the plurality of virtual lines and the location of the blank dot. Both the first virtual grid line and the second virtual grid line have at least one collinear set having three immediately-adjacent physical grid dots. The three immediately-adjacent physical grid dots are spaced with a same distance on the first virtual grid line or on the second virtual grid line. The blank dot is located in the middle of the center physical grid dot and an immediately-adjacent physical grid dot. The immediately-adjacent physical grid dot lies in the first virtual grid line, and has a distance twice than any other two immediately-adjacent physical grid dots on the first virtual grid line.

The claimed invention also discloses an electronic device for decoding a fetched scene on an encoded dotmap. The electronic device comprises an image sensor unit, a physical dot detector unit, a processor unit, and a storage unit. The image sensor unit is used for fetching a scene on an encoded dotmap. The physical dot detector unit has an input terminal coupled to an output terminal of the image sensor unit for recognizing a plurality of physical dots on the fetched scene. On the fetched scene, the recognized plurality of physical dots includes a plurality of physical grid dots and a plurality of data dots. The processor unit has an input terminal coupled to an output terminal of the physical dot detector unit for determining information about the plurality of physical dots, which are recognized by the physical dot detector. The determined information about the plurality of physical dots includes a plurality of grid lines. Each of the plurality of grid lines comprises at least one collinear set having three immediately-adjacent physical grid dots. The three immediately-adjacent physical grid dots are spaced with a same distance. Each of the plurality of grid lines comprises a plurality of center physical grid dots. The plurality of center physical grid dots is located on intersections of the plurality of grid lines. The storage unit has a first bidirectional terminal coupled to a bidirectional terminal of the processor unit for storing information received from the processor unit. Operations of the processor unit comprises defining at least one blank dot on the plurality of grid lines located with one center physical grid dot to determine orientation of the fetched scene. The blank dot is located in the middle of the center physical grid dot and an immediately-adjacent physical grid dot. The immediately-adjacent physical grid dot has a distance twice than any other two immediately-adjacent physical grid dots of the center physical grid dot in one grid line.

These and other objectives of the present invention will no doubt become obvious to those of ordinary skill in the art after reading the following detailed description of the preferred embodiment that is illustrated in the various figures and drawings.

DETAILED DESCRIPTION

The present invention discloses a method of decoding a fetched scene on an encoded dotmap without using characteristics of both the center physical grid dot 11 and the direction indicating grid dot 12, where the characteristics of both the center physical grid dot 11 and the direction indicating grid dot 12 are different with other physical dots in the same encoded block. In the method of the present invention, the orientation of each encoded block is recognized by using collinear grid dots, which act as boundaries of each the encoded block, on the virtual grid lines. Therefore, both the center physical grid dot 11 and the direction indicating grid dot 12 become harder to be recognized by naked eyes since both the center physical grid dot 11 and the direction indicating grid dot 12 may be allowed to have same characteristics with other physical dots on the same encoded block.

Figure 1:
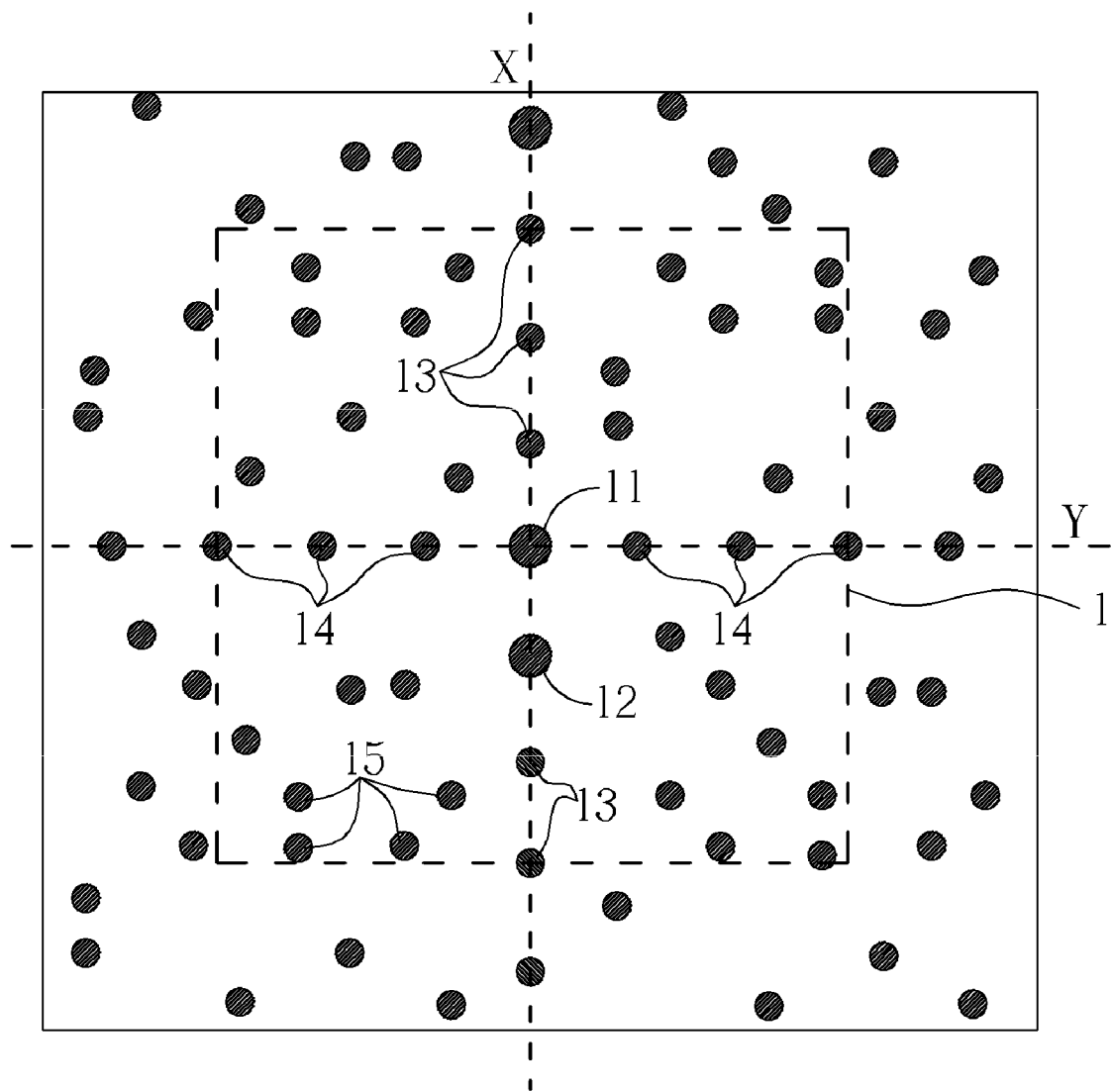
FIG. 1 is a diagram of illustrating how grid dots of an encoded dotmap are used for indicating orientation of a scene, which covers a plurality of encoded blocks on the encoded dotmap.
Figure 2:
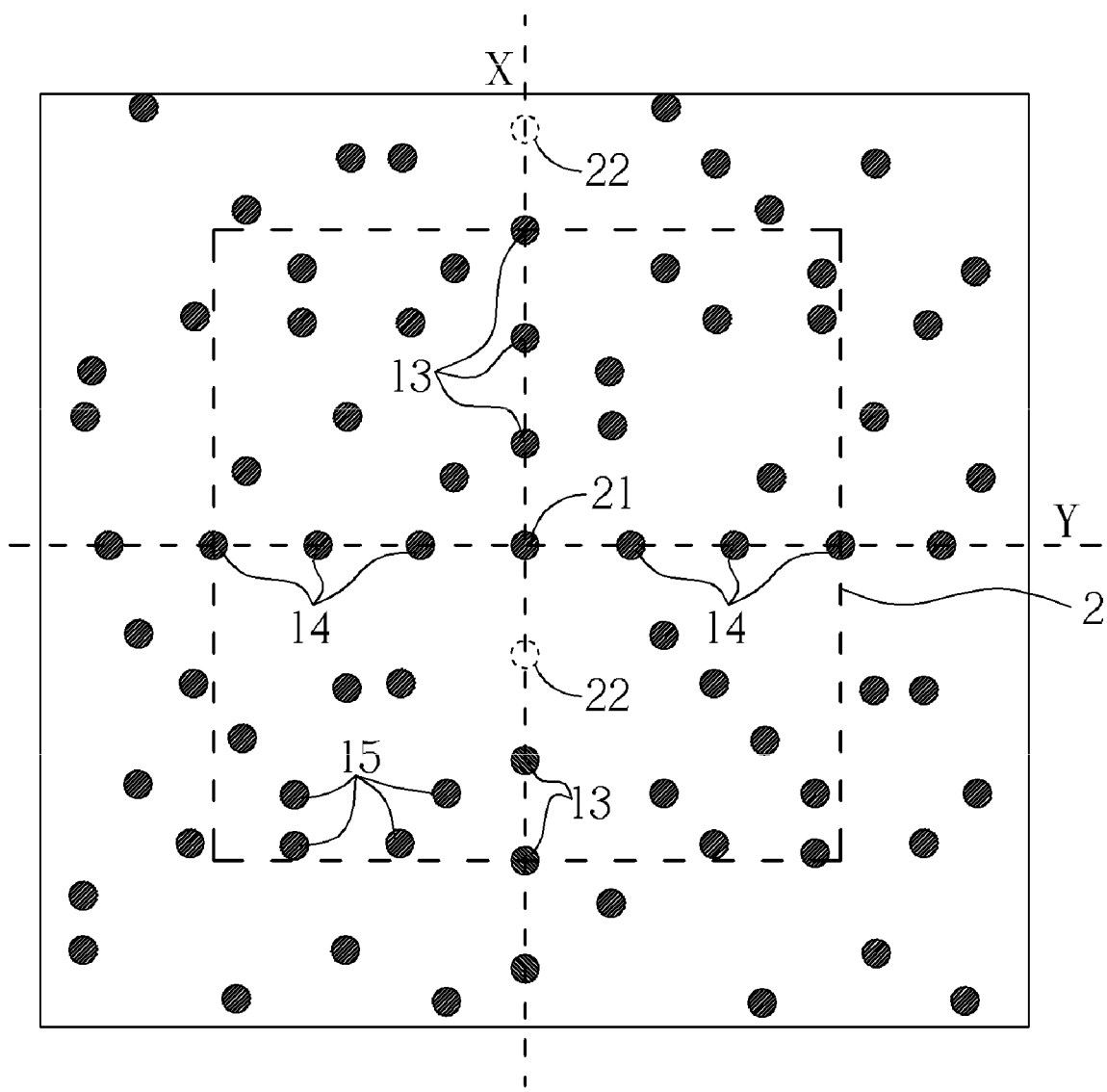
FIG. 2 is a diagram for illustrating how the method of the present invention is used on a fetched scene adapted from the scene shown in FIG. 1.

Please refer to FIG. 2, which is a diagram for illustrating how the method of the present invention is used on a fetched scene 2 adapted from the scene 1 shown in FIG. 1. Note that the center physical grid dot 11 is replaced with a center physical center physical grid dot 21 having same characteristics with the first plurality of physical grid dots 13, the second plurality of grid dots 14, and the plurality of data dots 15. Also note that the direction indicating grid dot 12 is replaced with a blank dot 22, i.e., the direction indicating grid dot 12 is not painted with any type of ink in embodiments of the present invention. Therefore, physical dots on the scene 2 are getting harder to be recognized by naked eyes than physical dots on the scene 1 shown in FIG. 1, and the orientation indicated by a combination of the physical center physical grid dot 21 and the blank dot 22 remains in the embodiment shown in FIG. 2. Note that the blank dot 22 has not been perceived by a related program running the disclosed method of the present invention in the beginning.

Note that the encoded dotmap having the fetched scene 2 includes a plurality of encoded blocks, such as the encoded blocks shown in FIG. 2. And the plurality of encoded blocks is sectored by virtual grid lines on the fetched scene 2.

Preparations about painting the dots shown in FIG. 2 for the method of decoding a fetched scene 2 in the present invention are described as follows. As can be observed from FIG. 2, a center physical grid got 21 is located at an intersection of a first virtual grid line X and a second virtual grid line Y. Moreover, the first plurality of physical grid dots 13 are painted on the first grid line X, whereas the second plurality of grid dots 14 are painted on the second grid line Y. A concept of collinear sets is introduced herein. A collinear set is defined to include three immediately-adjacent grid dots spaced with a same distance on the first virtual grid line X or the second virtual grid line Y. For example, in FIG. 2, three immediately-adjacent physical grid dots 13 form a collinear set on the first grid line X, whereas three immediately-adjacent grid dots 14 form a collinear set on the second grid line Y as well. Note that the blank dot 22 for indicating the orientation of the fetched scene 2 with an immediately-adjacent center physical grid dot 21 is located in the middle of the center physical grid dot 21 and an immediately-adjacent physical grid dot 13 of the blank dot 22, i.e., the immediately-adjacent physical grid dot 13 of the blank dot 22 has a distance from the center physical grid dot 21 twice than the distance between any other two-immediately-adjacent physical grid dots on the first virtual grid line X.

After the above preparations about painting the physical dots shown in FIG. 2, the method of decoding the fetched scene 2 in the present invention are described as follows. First, each center physical grid dot 21 covered by the scene 2 is determined according to each intersection, at which each the center physical grid dot 21 is located, of the first virtual grid line X and the second virtual grid line Y on the encoded dotmap. A plurality of physical dots on the encoded dotmap is then recognized, where the plurality of physical dots on the encoded dotmap includes the first plurality of physical grid dots 13 on the virtual grid line X and the second plurality of physical grid dots 14 on the virtual grid line Y. The blank dot 22 is defined on the first virtual line X at this time according to a property of the blank dot 22 that the blank dot 22 is located in the middle of the center physical grid dot 21 and an immediately-adjacent physical grid dot 13, which has a distance twice than any other two immediately-adjacent physical grid dots 13 on the first virtual grid line X.

Figure 3:
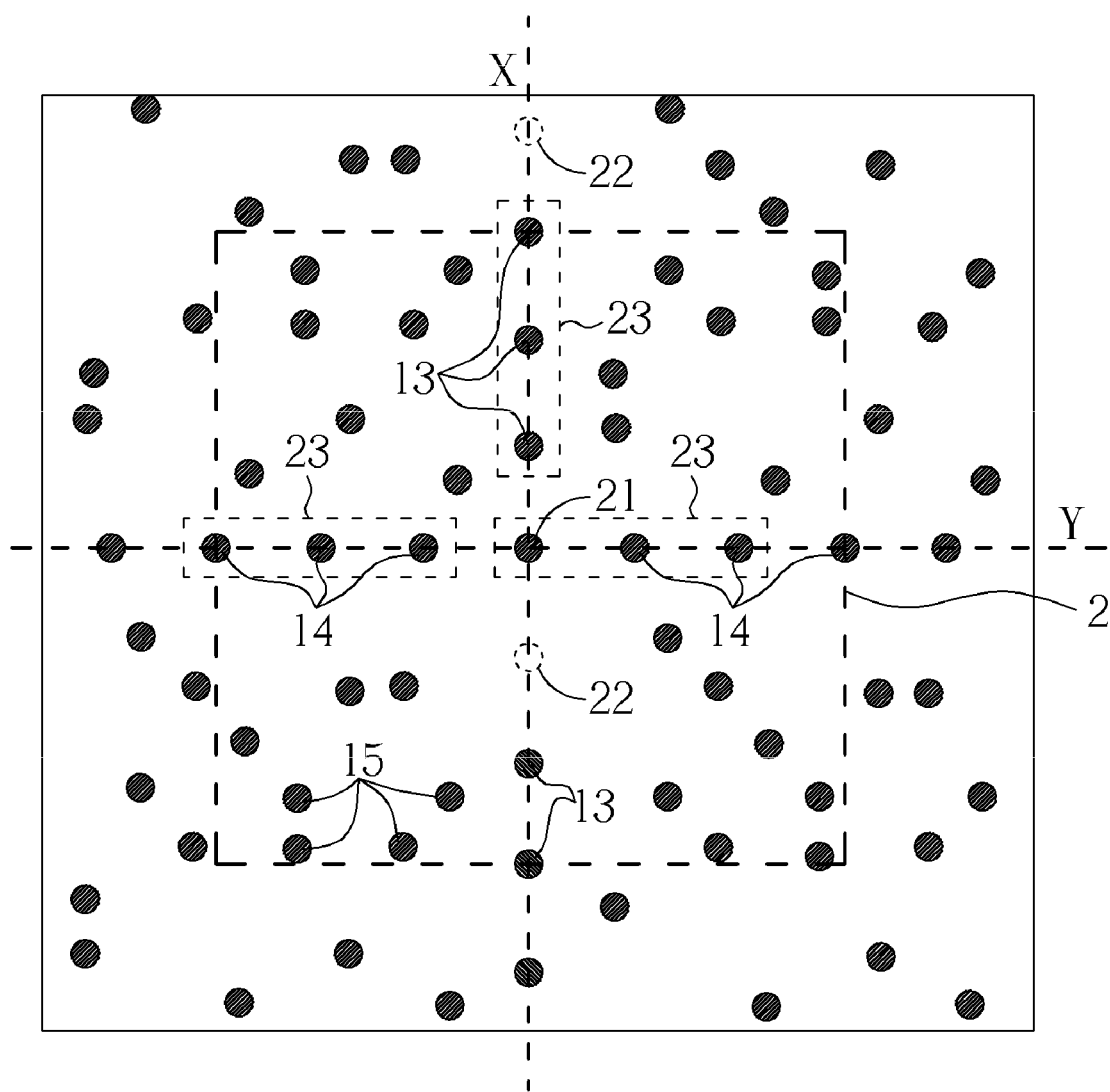
FIG. 3 is a diagram illustrating a plurality of collinear sets formed on the fetched scene shown in FIG. 2.

Please refer to FIG. 3, which is a diagram illustrating a plurality of collinear sets formed on the fetched scene 2 shown in FIG. 2. As shown in FIG. 3, there are a plurality of exemplary collinear sets 23, each of which includes three collinear physical grid dots on either one of the virtual grid lines X and Y, though certain member grid dots of the plurality of collinear grid dots may overlap. Note that overlapped parts of certain collinear sets in the scene 2 are not illustrated on FIG. 3 or considered hereafter for clearance.

Figure 4:
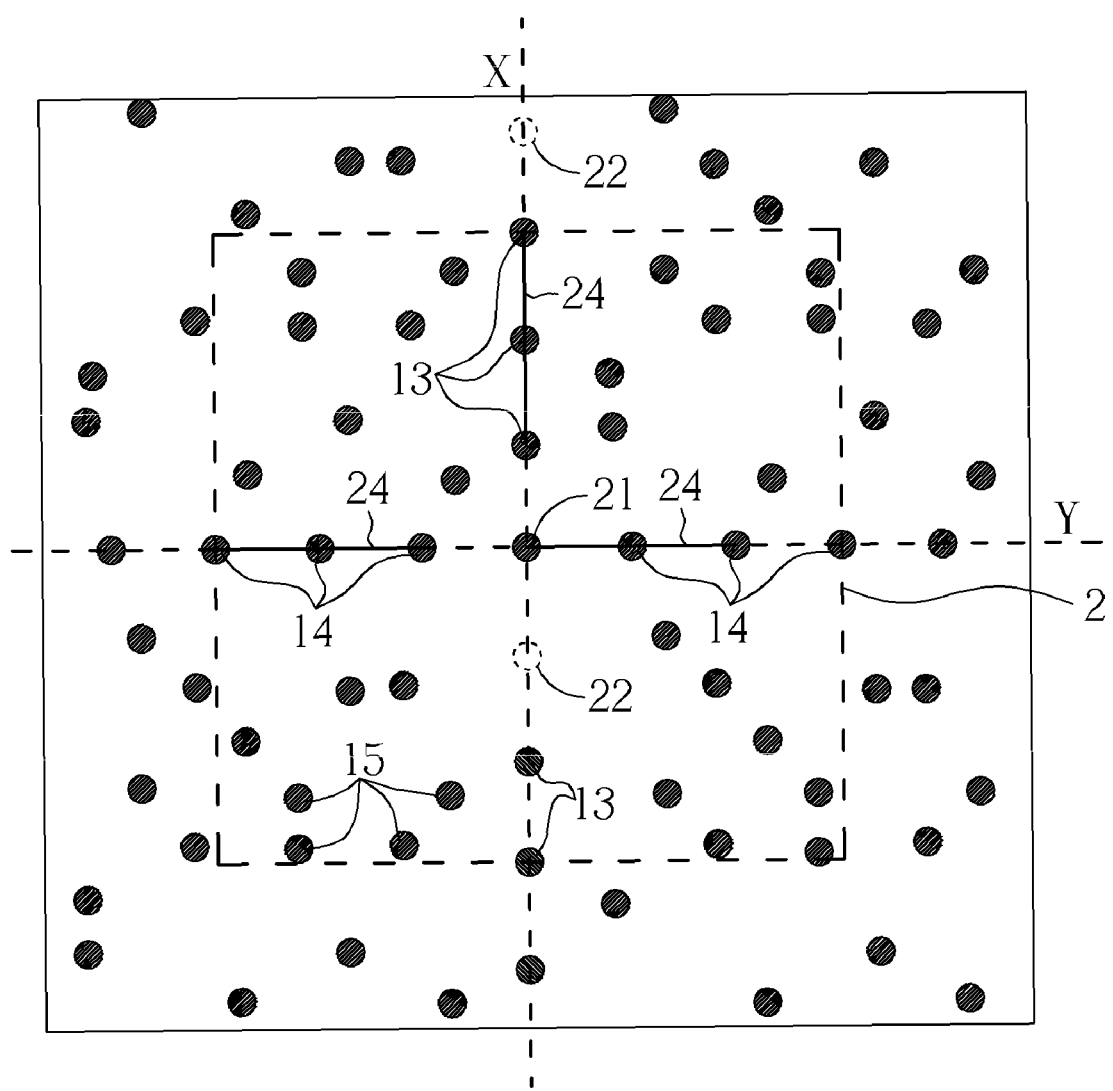
FIG. 4 illustrates a plurality of virtual grid line segments generated corresponding to the plurality of collinear sets shown in FIG. 3.

Note that virtual lines on the encoded dotmap are generated in a one-by-one correspondence with the plurality of collinear sets on said encoded dotmap. Please refer to FIG. 4, which illustrates a plurality of virtual grid lines 24 generated corresponding to the plurality of collinear sets 23 shown in FIG. 3. As shown in FIG. 4, a plurality of virtual grid lines 24 are generated by connecting physical grid dots within each of the plurality of collinear sets 23 shown in FIG. 3 and by the program running the disclosed method of the present invention. Moreover, part of the plurality of virtual grid lines 24 are parallel to the first virtual grid line X, whereas other of the plurality of virtual grid lines 24 are parallel to the second virtual grid line Y.

Figure 5:
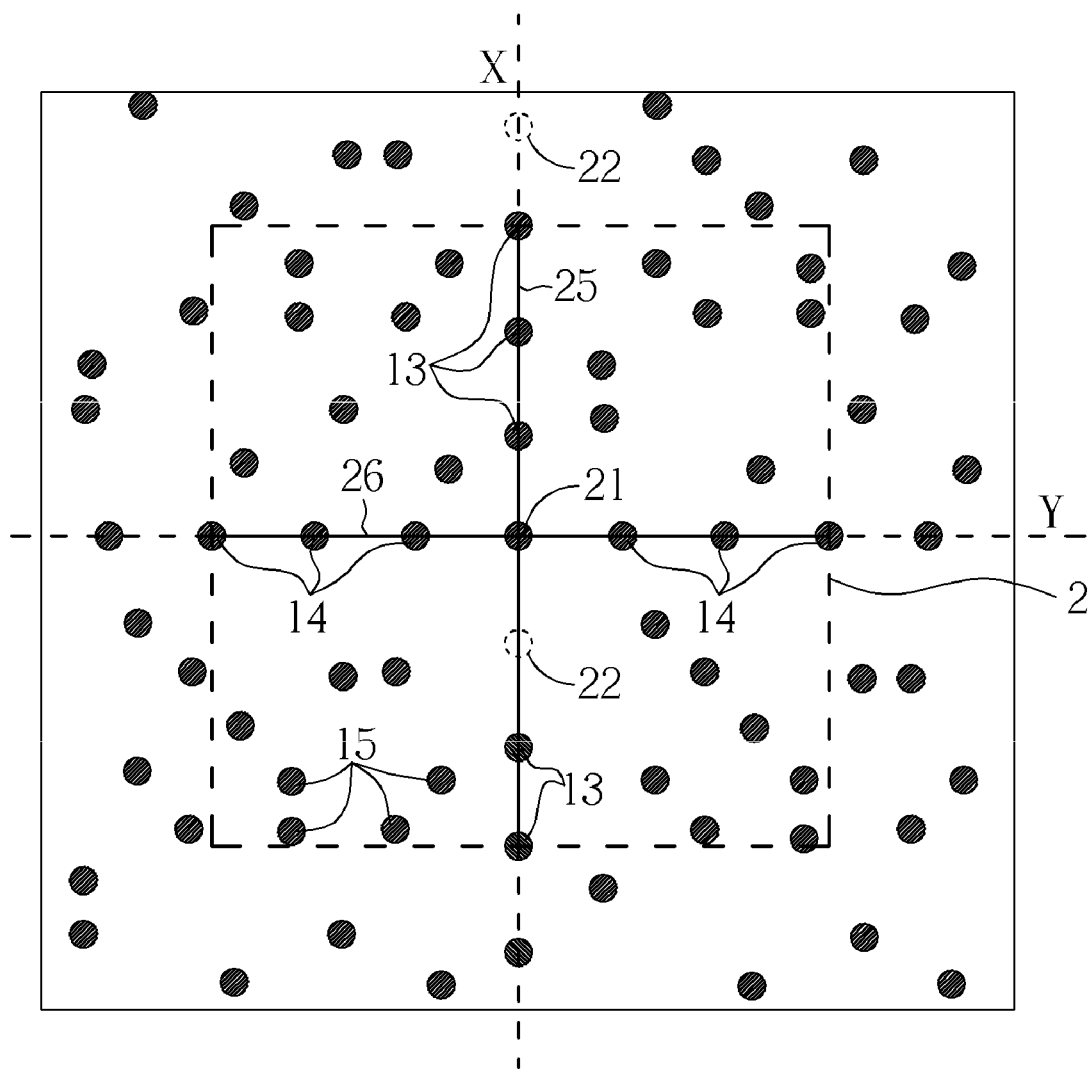
FIG. 5 illustrates generating virtual grid lines by stretching the virtual grid segments 24 shown in FIG. 4 until meeting the borders of the fetched scene.

By stretching the virtual grid lines 24 shown in FIG. 4 on each physical grid dot of each the virtual grid lines 24 by the program running the disclosed method of the present invention, a first virtual grid line 25, which are parallel to the virtual grid line X within the scene 2, and a second virtual grid line 26, which are parallel to the virtual grid line Y within the scene 2, are generated as shown in FIG. 5. Note that the first virtual grid line 25 is orthogonal to the second virtual grid line 26 since the virtual grid line X is also orthogonal to the virtual grid line Y.

Since both the virtual grid lines 25 and 26 are generated, an intersect of the virtual grid lines 25 and 26 may be easily determined and thus be perceived by the program running the disclosed method of the present invention, i.e., a location of the center physical grid dot 21 may thus be determined as well. Note that the location of the center physical grid dot 21 is not perceived in the beginning of performing the decoding procedure.

Figure 6:
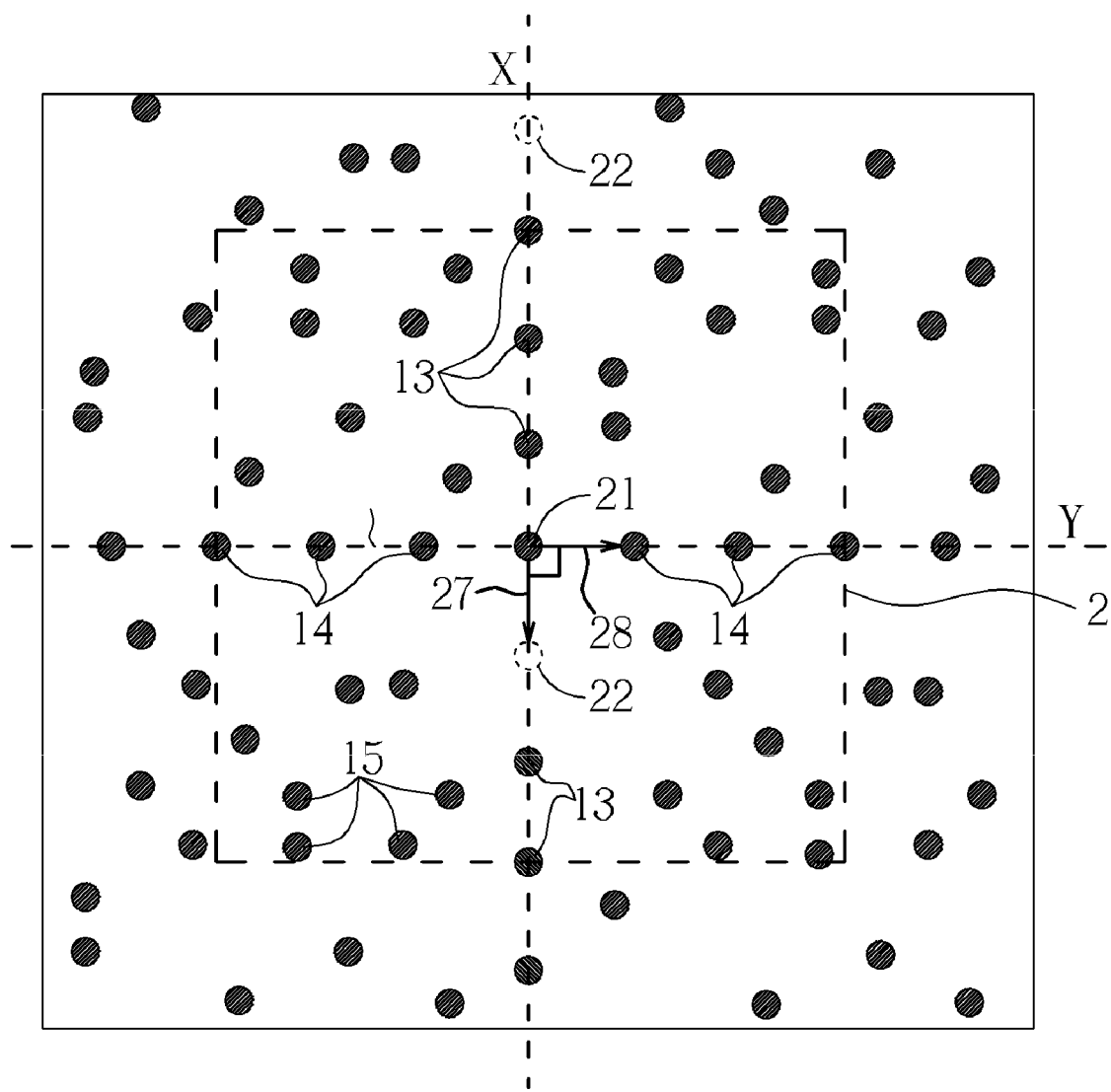
FIG. 6 illustrates determining orientation of the fetched scene in FIG. 5 according to two orthogonal directions.

Therefore, as a result, since both the center physical grid dot 21 and the blank dot 22 are perceived by the program running the disclosed method of the present invention, a first direction 27 from the center physical grid dot 21 to the blank dot 22 is also determined by said program soon, where the first direction 27 stretches from a center physical dot 21 to a blank dot 22 immediately-adjacent to the center physical dot 21. As shown in FIG. 6, the first direction 27 must be parallel to the first virtual grid line 25 and the virtual grid line X as well. Since the first direction 27 is determined, according to the orthogonality between the virtual grid lines 25 and 26 or between the virtual grid lines X and Y, a second direction 28, which is parallel to the virtual grid line 26 or Y, may also be determined so that the first direction 27 and the second direction 28 are orthogonal to each other. By combining the first direction 27 with the second direction 28 on the fetched scene 2, i.e., according to a location of a blank dot 22 on the fetched scene 2 and a center physical dot 21 closest to the blank dot 22 on said fetched scene 2, orientation of the fetched scene 2 is substantially determined.

At last, each the data dot 15 on the fetched scene 2 is decoded according to positional relation thereof with both a location of a closest center physical grid dot 21, which is indicated by a closest one of the intersects of virtual lines on the fetched scene 2, and a location of a blank dot 22 immediately-adjacent to the closest center physical grid dot 21. The positional relation between each the data dot 15 and both locations of the closest center physical grid dot 21 and the blank dot 22 may be further concretely referred as the positional relation between each the data dot 15 and the location of the closest intersect of the first virtual grid line X and the second virtual grid line Y. As can be observed from FIG. 6, four quadrants, which are respectively corresponding to four different sectored encoded blocks on the fetched scene 2, may be used for indicating different bit strings, such as '00', '01', '10', and '11'. In other words, the location where each the data dot 15 is located with respect to the location of the intersect, which acts as an origin herein, may be used for indicating one of the above bit strings so that the positional relation in the location of each the data dot 15 may used for indicating different types of data. Note that data indicated by the positional relation related to the location of the data dot 15 is not limited to the mentioned bit strings in other embodiments of the present invention. Contents of the data dots 15 in a same encoded block may refer to a coordinate of the encoded block. Any data dot 15 on the encoded dotmap is not located on the plurality of virtual lines on the encoded dotmap as well.

Figure 7:
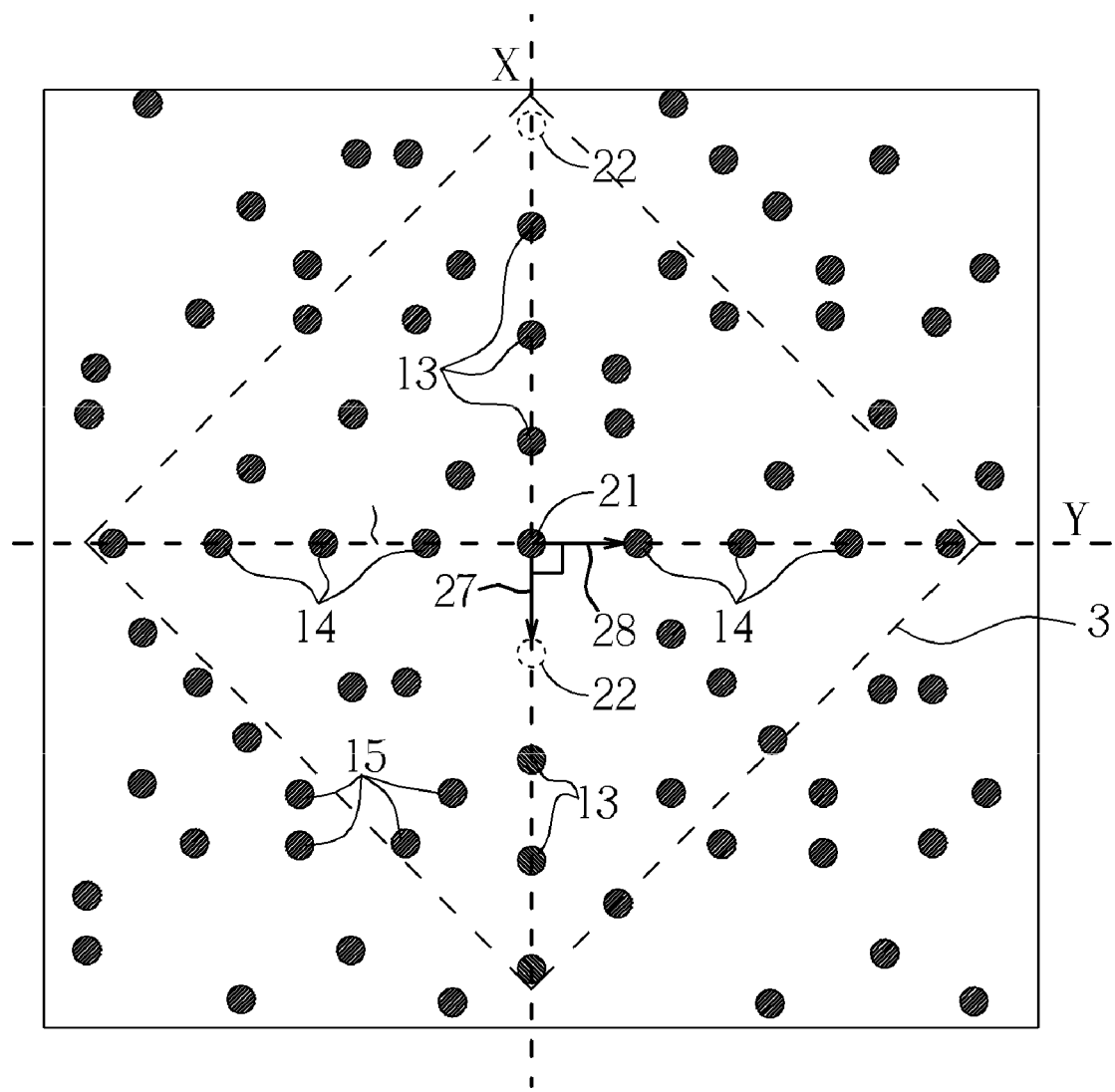
FIG. 7 illustrates a fetched scene 3 on the encoded dotmap having a tilt orientation from the orientation formed according to both the virtual grid lines shown in FIG. 2.

Note that in common embodiments of the present invention, while the scene 2 is fetched, the orientation of the fetched scene 2 may not be consistent with an orientation formed according to both the virtual grid lines X and Y, i.e., the orientation of the fetched scene 2 may be tilt from the orientation of the encoded dotmap. For example, as shown in FIG. 7, an orientation of a fetched scene 3 on the encoded dotmap is tilt from the orientation formed according to both the virtual grid lines X and Y. However, with the aid of the disclosed method of the present invention, both the center physical grid dot 21 and the blank dot 22 are still determined and perceived by the program running the disclosed method of the present invention quickly. Therefore, both the directions 27 and 28 are also instantly determined before the plurality of data dots 15 on the fetched scene 3 is decoded.

Figure 8:
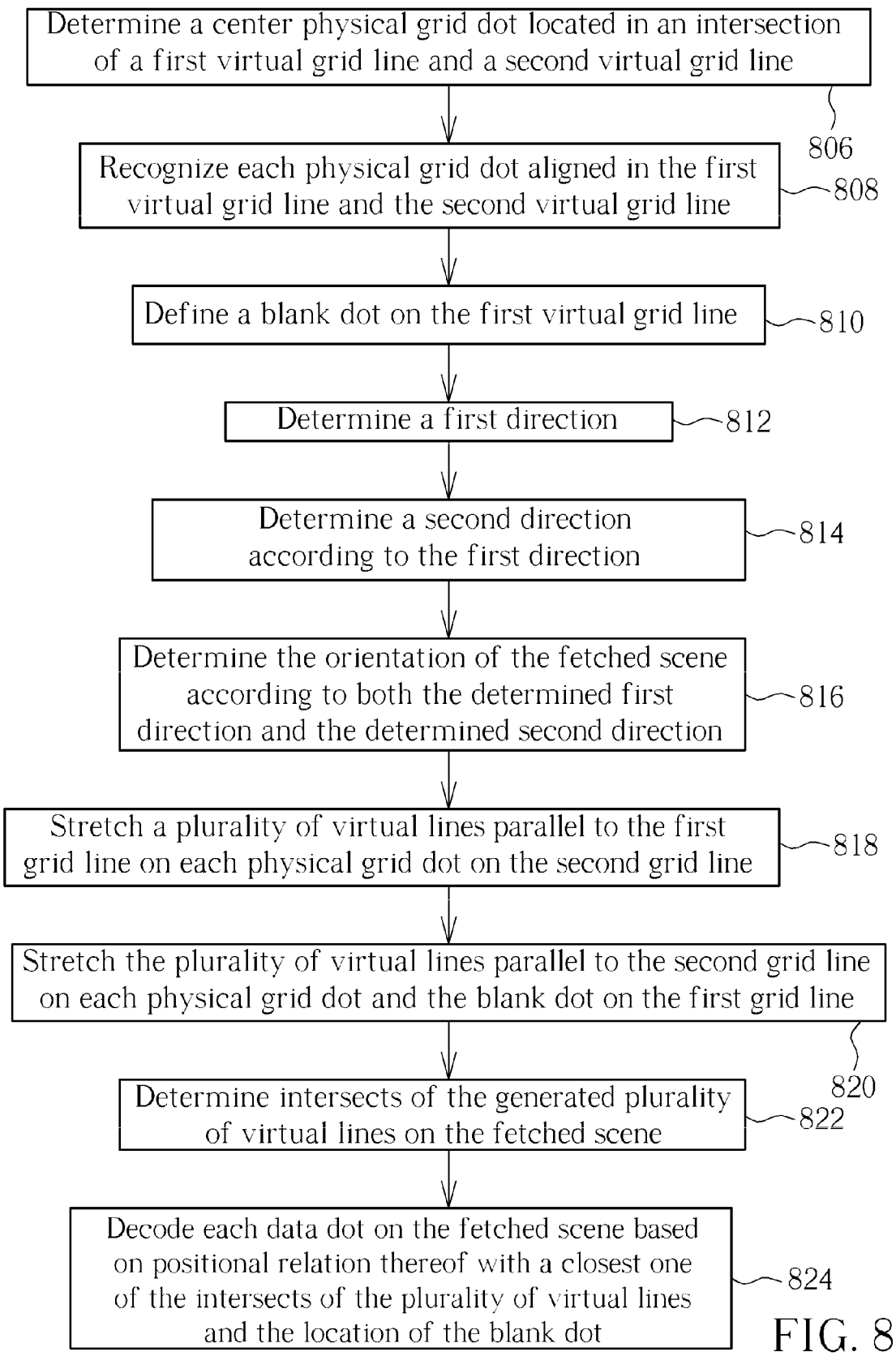
FIG. 8 is a flowchart of the disclosed method of determining orientation of a fetched scene on an encoded dotmap of the present invention.

Please refer to FIG. 8, which is a flowchart of the disclosed method of decoding a fetched scene on an encoded dotmap of the present invention. As shown in FIG. 8, the method of determining orientation of a fetched scene on an encoded dotmap includes steps as follows:

Step 806: Determine a center physical grid dot located in an intersection of a first virtual grid line and a second virtual grid line, where both the first virtual grid line and the second virtual grid line have at least one collinear set having three immediately-adjacent physical grid dots, which are spaced with a same distance on the first virtual grid line or on the second virtual grid line;

Step 808: Recognize each physical grid dot aligned in the first virtual grid line and the second virtual grid line;

Step 810: Define a blank dot on the first virtual grid line, where the blank dot is located in the middle of the center physical grid dot and an immediately-adjacent physical grid dot having a distance twice than any other two immediately-adjacent physical grid dots in the first grid line;

Step 812: Determine a first direction from the determined center physical grid dot to the corresponding defined blank dot;

Step 814: Determine a second direction according to the first direction;

Step 816: Determine the orientation of the fetched scene according to both the determined first direction and the determined second direction;

Step 818: Stretch a plurality of virtual lines parallel to the first grid line on each physical grid dot on the second grid line;

Step 820: Stretch the plurality of virtual lines parallel to the second grid line on each physical grid dot and the blank dot on the first grid line;

Step 822: Determine intersects of the generated plurality of virtual lines on the fetched scene; and Step 824: Decode each data dot on the fetched scene based on positional relation thereof with a closest one of the intersects of the plurality of virtual lines and the location of the blank dot.

Details of the steps illustrated in FIG. 8 have been described in the above descriptions so that the details are not repeatedly described herein. Note that permutations and combinations of steps of the method of the present invention are not restricted to those shown in FIG. 8. In other words, embodiments generated according to permutations and combinations of steps shown in FIG. 8 should be regarded as embodiments of the present invention as well.

Figure 9:
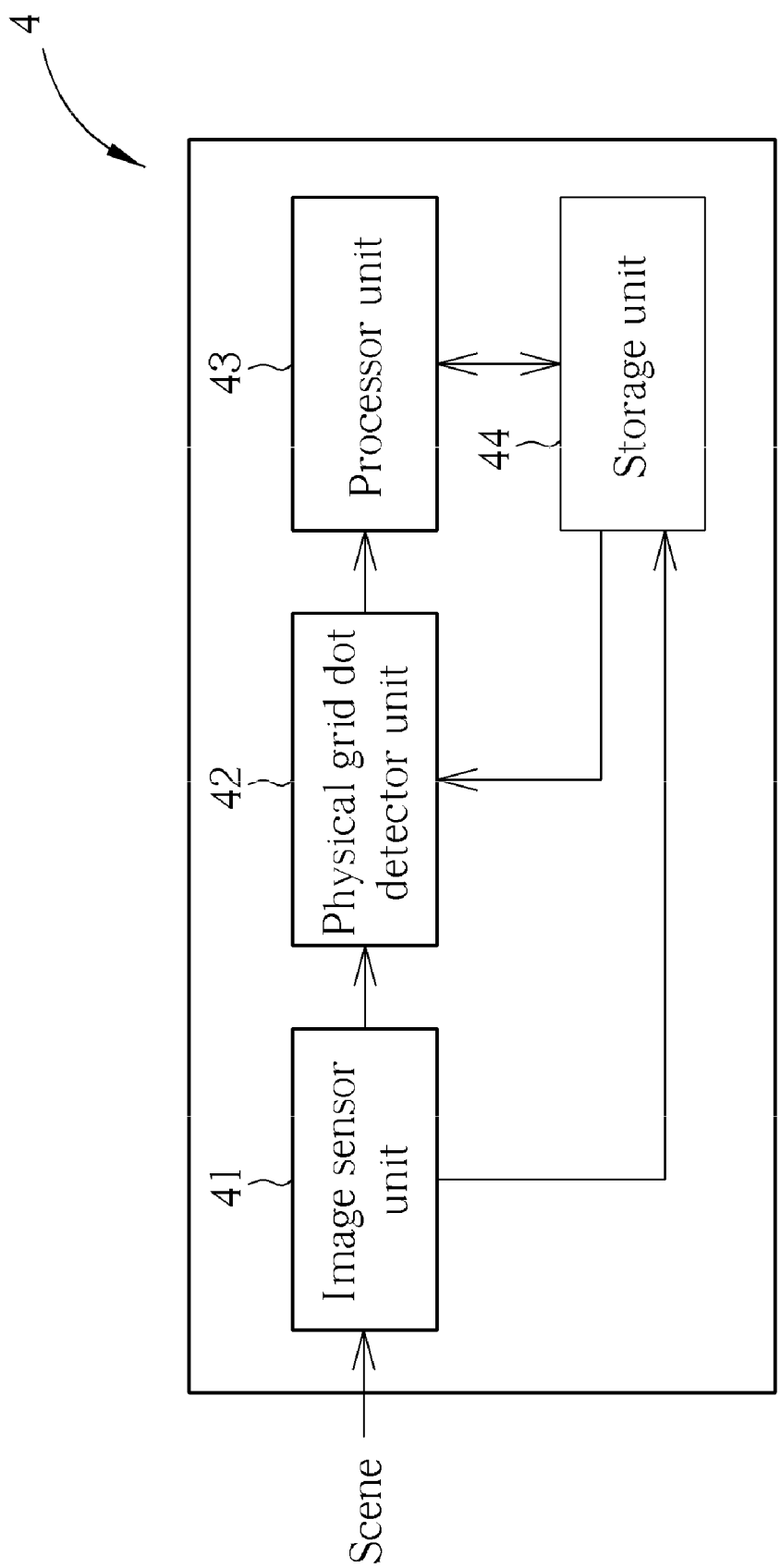
FIG. 9 is a block diagram of an electronic device for implementing the disclosed method of the present invention shown in FIG. 8.

Please refer to FIG. 9, which is a block diagram of an electronic device 4 for implementing the disclosed method of the present invention shown in FIG. 8. Note that the above-mentioned program for running the disclosed method of the present invention is installed on the electronic device 4. As shown in FIG. 9, the electronic device 4 includes an image sensor unit 41, a physical dot detector unit 42, a processor unit 43, and a storage unit 44. The image sensor unit 41 is used for fetching the scenes 2 or 3 on the encoded dotmap. The physical dot detector unit 42 has an input terminal coupled to an output terminal of the image sensor unit 41 for perceiving a plurality of physical dots on the fetched scene 2 or 3, where the perceived plurality of physical dots includes the center physical grid dots 21, the first plurality of physical grid dots 13, the second plurality of physical grid dots 14, and the data dots 15. The processor unit 43 has an input terminal coupled to an output terminal of the physical dot detector unit 42 for determining information about the physical dots perceived by the physical dot detector 42. The determined information includes a plurality of grid lines. Each of the plurality of grid lines includes at least one collinear set having three immediately-adjacent physical grid dots spaced with a same distance. Each of the plurality of grid lines also includes a plurality of center physical grid dots located on intersections of the plurality of grid lines. The processor unit 43 is further responsible for running the disclosed method of the present invention according to the installed program for running the disclosed method of the present invention. Related operations of the processor unit 43 include Step 806, Step 810, Step 818, Step 820, Step 822, and Step 824. The storage unit 44 has a first bidirectional terminal coupled to a bidirectional terminal of the processor unit 43 for storing information received from the processor unit 43. The physical dot detector 42 is also responsible for reporting locations of the blank dots 22 back to the storage unit 44.

The present invention discloses a method of decoding a fetched scene on an encoded dotmap and an electronic device for performing the disclosed method. With the aid of both the disclosed method and the electronic device, even same characteristics are applied on the center physical grid dot and other physical grid dots on virtual grid lines, and by applying a blank dot, a combination of the center physical grid dot and the blank dot may be used for indicating orientation of an encoded block, and even an orientation of the encoded dotmap. After determining the orientation of the encoded dotmap, information hidden in data dots on the fetched scene of the encoded dotmap may be easily decoded.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of decoding a fetched scene on an encoded dotmap, comprising:
   determining a center physical grid dot located in an intersection of a first virtual grid line and a second virtual grid line, wherein both the first virtual grid line and the second virtual grid line have at least one collinear set having three immediately-adjacent physical grid dots, which are spaced with a same distance on the first virtual grid line or on the second virtual grid line;
   recognizing each physical grid dot aligned in the first virtual grid line and the second virtual grid line;
   defining a blank dot on the first virtual grid line, wherein the blank dot is located in the middle of the center physical grid dot and an immediately-adjacent physical grid dot having a distance twice than any other two immediately-adjacent physical grid dots in the first virtual grid line;
   stretching a plurality of virtual lines parallel to the first virtual grid line on each physical grid dot on the second virtual grid line;
   stretching the plurality of virtual lines parallel to the second virtual grid line on each physical grid dot and the blank dot on the first virtual grid line;
   determining intersects of the generated plurality of virtual lines on the fetched scene; and
   decoding each data dot on the fetched scene based on positional relation thereof with a closest one of the intersects of the plurality of virtual lines and the location of the blank dot.

2. The method of claim 1 further comprising:
   generating the plurality of virtual lines in a one-by-one correspondence to the plurality of collinear sets.

3. The method of claim 1
   wherein the encoded dotmap comprises a plurality of encoded blocks aligned as a two-dimensional matrix, and the plurality of encoded blocks on the fetched scene are sectored by the generated virtual grid lines.

4. The method of claim 3 wherein each the center physical grid dot is immediately followed by a corresponding defined blank dot for indicating orientation of a corresponding encoded block on the fetched scene.

5. The method of claim 3
   wherein each of the plurality of encoded blocks has the plurality of data dots for indicating a coordinate of each the encoded block;
   wherein anyone of the plurality of data dots is not located on the generated plurality of virtual grid lines.

6. The method of claim 1 further comprises:
   determining a first direction from the determined center physical grid dot to the corresponding defined blank dot;
   determining a second direction according to the first direction; and
   determining the orientation of the fetched scene according to both the determined first direction and the determined second direction.

7. The method of claim 6 wherein determining the second direction according to the first direction comprises:
   determining the second direction to be an orthogonal direction of the first direction.

8. The method of claim 7
   wherein the first direction is parallel to the first virtual grid line;
   wherein the second direction is parallel to the second virtual grid line.

9. The method of claim 6 wherein the orientation of the fetched scene is tilt from the orientation of the encoded dotmap.

10. An electronic device of decoding a fetched scene on an encoded dotmap, comprising:
    an image sensor unit for fetching a scene on an encoded dotmap;
    a physical dot detector unit having an input terminal coupled to an output terminal of the image sensor unit for recognizing a plurality of physical dots on the fetched scene, in which the recognized physical dots including a plurality of physical grid dots and a plurality of data dots;

a processor unit having an input terminal coupled to an output terminal of the physical dot detector unit for determining information about the physical dots recognized by the physical dot detector, in which the information includes a plurality of grid lines, each grid line comprising at least one collinear set having three immediately-adjacent physical grid dots spaced with a same distance, and comprising a plurality of center physical grid dots located on intersections of the plurality of grid lines; and a storage unit having a first bidirectional terminal coupled to a bidirectional terminal of the processor unit for storing information received from the processor unit;

wherein operations of the processor unit comprises defining at least one blank dot on the plurality of grid lines located with one center physical grid dot to determine orientation of the fetched scene, the blank dot located in the middle of the center physical grid dot and an immediately-adjacent physical grid dot having a distance twice than any other two immediately-adjacent physical grid dots in one grid line.

11. The electronic device of claim 10 wherein operations of the processor unit comprises:

determining a plurality of center physical grid dots located at intersections of a plurality of first virtual grid lines and a plurality of second virtual grid lines, wherein each the first virtual grid line and the second virtual grid line have at least one collinear set having three immediately-adjacent physical grid dots, which are spaced with a same distance on the first virtual grid line or on the second virtual grid line;

defining the blank dot on one first virtual grid line;

stretching a plurality of virtual lines parallel to the first virtual grid line on each physical grid dot on the second virtual grid line;

stretching the plurality of virtual lines parallel to the second virtual grid line on each physical grid dot and the blank dot on the first virtual grid line;

determining intersects of the generated plurality of virtual lines on the fetched scene; and decoding each data dot on the fetched scene based on positional relation thereof with a closest one of the intersects and the location of the blank dot;

wherein a program for running the operations of the processor unit is installed on said processor unit.

12. The electronic device of claim 11 wherein the encoded dotmap comprises a plurality of encoded blocks aligned as a two-dimensional matrix, and the plurality of encoded blocks on the fetched scene are sectored by the grid lines.

13. The electronic device of claim 12 wherein each the center physical grid dot is immediately followed by a corresponding defined blank dot for indicating orientation of a corresponding encoded block on the fetched scene.

14. The electronic device of claim 12
wherein each of the plurality of encoded blocks has the plurality of data dots for indicating a coordinate of each the encoded block;
wherein anyone of the plurality of data dots is not located on the grid lines.

15. The electronic device of claim 11 wherein operations of the processor unit further comprises:

determining a first direction from each the center physical grid dot to the defined blank dot corresponding to said center physical grid dot;

determining a second direction according to the first direction; and determining the orientation of the fetched scene according to both the determined first direction and the determined second direction.

16. The electronic device of claim 15 wherein the second direction is orthogonal to the first direction.

17. The electronic device of claim 16
wherein the first direction is parallel to the first virtual grid line; and
wherein the second direction is parallel to the second virtual grid line.

18. The electronic device of claim 15 wherein the orientation of the fetched scene is tilt from the orientation of the encoded dotmap.

* * * * *